(12) United States Patent
Dereszynski et al.

(10) Patent No.: US 11,663,192 B2
(45) Date of Patent: May 30, 2023

(54) IDENTIFYING AND RESOLVING DIFFERENCES BETWEEN DATASTORES

(71) Applicant: Oracle International Corporation, Redwood Shores, CA (US)

(72) Inventors: Ethan William Dereszynski, Oregon City, OR (US); Sean Jay McNamara, Lehi, UT (US)

(73) Assignee: Oracle International Corporation, Redwood Shores, CA (US)

( * ) Notice: Subject to any disclaimer, the term of this patent is extended or adjusted under 35 U.S.C. 154(b) by 24 days.

(21) Appl. No.: 17/117,900

(22) Filed: Dec. 10, 2020

(65) Prior Publication Data

US 2022/0188288 A1 Jun. 16, 2022

(51) Int. Cl.
*G06F 16/00* (2019.01)
*G06F 16/23* (2019.01)
*G06F 16/22* (2019.01)

(52) U.S. Cl.
CPC ...... *G06F 16/2365* (2019.01); *G06F 16/2246* (2019.01); *G06F 16/2255* (2019.01); *G06F 16/2379* (2019.01)

(58) Field of Classification Search
CPC .. G06F 11/14; G06F 11/1451; G06F 11/1453; G06F 11/1458; G06F 11/1469; G06F 11/2094; G06F 3/0608; G06F 3/0619; G06F 3/064; G06F 3/065; G06F 16/2255; G06F 16/217; G06F 16/2379; G06F 16/285; G06F 16/41; G06F 16/51; G06F 21/51; G06F 21/53; G06F 21/645; G06F 2221/2115; G06F 2221/2119; G06F 8/60; G06F 8/73; G06F 16/2246; G06F 16/219; G06F 16/2282; G06F 16/9537; G06F 16/2365; G06F 16/24568; G06F 16/583; G06F 11/2025; G06F 16/2272; G06F 16/2315; G06F 16/24524; G06F 16/252; G06F 16/9014; G06F 21/6227;

(Continued)

(56) References Cited

U.S. PATENT DOCUMENTS 11,366,801 B1 * 6/2022 Kumar ................ G06F 16/2365
2014/0108817 A1 * 4/2014 Chen .................... H04L 63/123
713/189

(Continued)

OTHER PUBLICATIONS

Armbrust Michael michael@databricks com et al, "Spark SQL Relational Data Processing in Spark," Proceedings of the 2015 ACM SIGMOD International Conference on Management of Data, SIGMOD '15, ACM Press, New York, New York, USA, May 27, 2015, pp. 1383-1394.

*Primary Examiner* — Shyue Jiunn Hwa
(74) *Attorney, Agent, or Firm* — Invoke

(57) ABSTRACT

Techniques for efficiently maintaining consistency of data items across storage partitions are disclosed using a hierarchical multi-level hash tree. Copies of a data item may be associated with corresponding attributes that are used to generate hash values for the data item. Hash values of the attributes may then be used to label nodes in a multi-level hash tree. Differences between the replicated copies of a data item may be quickly identified by comparing hash values associated with successively lower peer nodes in corresponding hash trees. Once identified, systems may update versions of a data item that are no longer current.

23 Claims, 8 Drawing Sheets

(58) Field of Classification Search
CPC ...... G06F 21/64; G06F 9/542; G06F 16/9024; G06F 21/6218; G06F 2221/2107; G06F 21/78; G06F 21/602; G06F 16/27; G06F 16/278; G06F 16/215; G06F 16/24539; G06F 16/951; G06F 16/2477; G06F 16/245; G06F 16/113; G06F 16/2358; G06F 16/24554
See application file for complete search history.

(56) References Cited

U.S. PATENT DOCUMENTS

| | | |
|---|---|---|
| 2015/0026167 A1 | 1/2015 | Neels et al. |
| 2016/0012280 A1* | 1/2016 | Ito .................. G06V 40/173 |
| | | 382/305 |
| 2016/0042015 A1 | 2/2016 | Landau et al. |
| 2017/0006135 A1 | 1/2017 | Siebel et al. |
| 2017/0039242 A1* | 2/2017 | Milton ................ H04W 4/02 |
| 2020/0012647 A1 | 1/2020 | Johnson et al. |
| 2020/0202127 A1 | 6/2020 | Chen et al. |
| 2022/0058732 A1* | 2/2022 | Reses ................ H04L 9/3213 |

* cited by examiner

IDENTIFYING AND RESOLVING DIFFERENCES BETWEEN DATASTORES

TECHNICAL FIELD

The present disclosure relates to techniques for maintaining consistency between data resources in multiple datastores. In particular, the present disclosure relates to identifying and resolving differences between corresponding data resources in different datastores.

BACKGROUND

Modern data storage systems generally include multiple storage servers, each of which is generally divided into several logical partitions, to organize stored data. In addition to the storage nodes storing data and providing access to requests to retrieve, storage servers may duplicate data items so as to create data redundancy across multiple storage servers and/or partitions. This data redundancy preserves access to a data item in the event that one server is inactive or in the event that one of the redundant copies of a data item is lost or corrupted. However, maintaining consistency between different redundant versions of the same data item may be challenging.

Many techniques currently used to maintain data item consistency throughout a storage system may rely on a master server that coordinates the replication of data across storage servers using a centralized data index. Other techniques may involve using a separate computing application that determines whether the various versions of a data item at the various storage locations are current (i.e., the most recent update has been synchronized to all stored copies). These techniques generally involve significant computing resources to execute. In some cases, these techniques may even disengage data storage servers from active use during the execution of their analysis.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. SYSTEM ARCHITECTURE
3. IDENTIFYING AND RESOLVING DIFFERENCES BETWEEN STORED DATA ITEMS
   3.1 MULTI-LEVEL HASH TREE GENERATION
   3.2 IDENTIFYING AND RESOLVING DIFFERENCES BETWEEN REDUNDANT DATA ITEMS
4. EXAMPLE EMBODIMENT
5. COMPUTER NETWORKS AND CLOUD NETWORKS
6. MISCELLANEOUS; EXTENSIONS
7. HARDWARE OVERVIEW

1. General Overview

One or more embodiments described herein may be used to monitor changes to copies of a data item (e.g., replicated copies used for data redundancy) in a storage system. The system stores and accesses a data item based on a set of attributes associated with the data item. The attributes may include one or more of an account identifier, a time associated with a data transaction executed on the data item, a table identifier, and a data storage tier (e.g., an active or inactive tier). The system hashes attributes associated with a data item and maps the resulting hash value to a particular leaf node (among other leaf nodes) associated with a multi-level hash tree. The system stores an association between the data item and the particular leaf node. The system may update a node hash value associated with the particular leaf node based on the data item, and in some cases based on the hash value of the first data item. Similarly, the system may also update hash values associated with nodes at higher levels in the multi-level hash tree that are "related" (i.e., hierarchically connected) to the leaf node storing the data item.

Generally, an update to a leaf node hash value will cause an update to at least one higher level node at each level of the multi-level hash tree.

One advantage of embodiments described herein includes computationally efficient identification of differences between copies of replicated data items by comparison of hash values of peer nodes in different multi-level hash trees. Also, embodiments described herein may be executed as background processes by peer storage servers. In these embodiments, no master server or administrator application need be used and storage servers need not be removed from active use.

One or more embodiments described in this Specification and/or recited in the claims may not be included in this General Overview section.

2. Architectural Overview

Figure 1A:
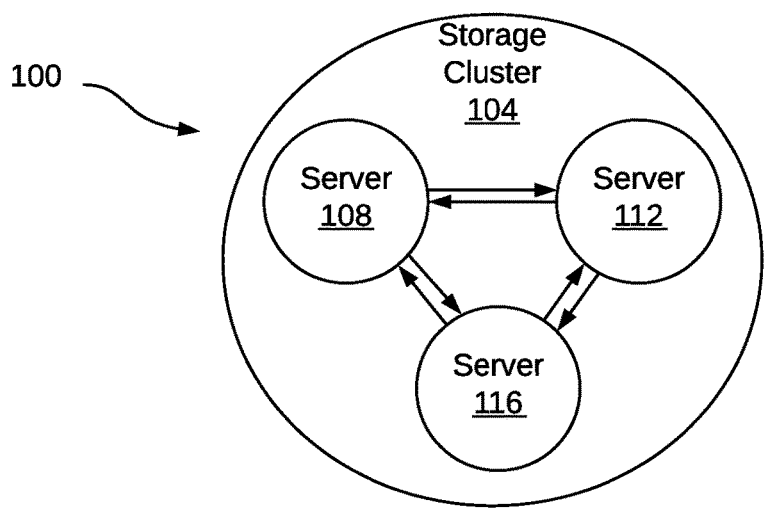
FIG. 1A is a schematic illustration of a multi-server storage cluster in which peer servers may communicate in background processes to maintain consistency between replicated copies of data items, in accordance with one or more embodiments.

FIG. 1A illustrates a system 100 in accordance with one or more embodiments. As illustrated in FIG. 1, system 100 illustrates a storage cluster 104 that includes storage servers 108, 112, and 116. In one or more embodiments, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

The storage cluster 104 is configured to store data items and to replicate data items to multiple servers 108, 112, and 116 within the storage cluster 104. Replicating data items so that two or more of the servers 108, 112, and 116 store any particular data items may enable the system to provide access to the data items even if one of the servers 108, 112, or 116 is not accessible or if one of the replicated data items stored on one of the servers 108, 112, or 116 is corrupted.

The system 100 may cause a data item to be replicated from a first server (such as server 108) to one or more of the other servers (e.g., servers 108, 112) in the storage cluster 104. The communication between the servers 108, 112, and 116 that enables data item replication and retrieval between the nodes is schematically illustrated by arrows between the servers 108, 112, and 116 in FIG. 1A. As explained below in more detail, the system may use the communication between the nodes 108, 112, and 116 to efficiently identify replicated versions of a data item that are no longer current. Whether the differing versions of an item are stored in different servers 108, 112, and 116 of the storage cluster 104, different partitions of the storage cluster, or both, the system may identify the stored locations of the differing versions of the data item, identify a current version and out of date versions, and update the out of date versions.

Figure 1B:
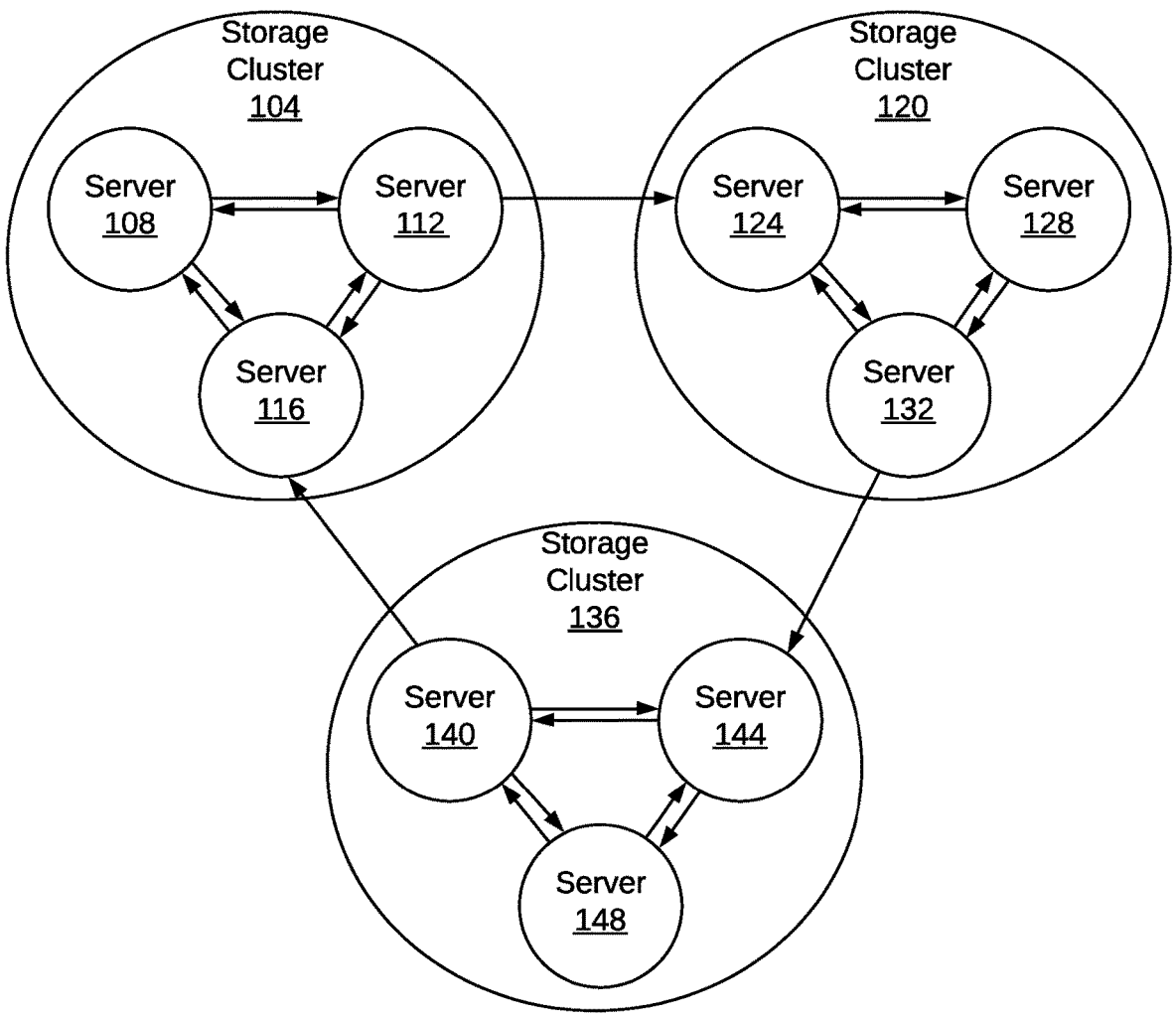
FIG. 1B is a schematic illustration of a multi-cluster storage system in which peer servers and peer clusters may communicate with one another in background processes to maintain consistency between replicated copies of data items stored throughout the storage system in accordance with one or more embodiments.

As schematically illustrated in FIG. 1B, some embodiments of the present disclosure may be applied to a storage system 118 that includes multiple storage clusters 104, 120, and 136. Each of the storage clusters 104, 120, and 136 may in turn include multiple storage servers. In the example illustrated in FIG. 1B: storage cluster 104 includes servers 108, 112, and 116; storage cluster 120 includes servers 124, 128, 132; and storage cluster 136 includes servers 140, 144, and 148.

As schematically illustrated in FIG. 1B by arrows connecting the clusters 104, 120, 136 and the various servers therein, embodiments of the present disclosure may be applied to any number of storage clusters and/or storage servers that are in communication with one another. As described below, embodiments of the present disclosure may be applied to maintain consistency of replicated data items by identifying differences between replicated versions of a data item and identifying the corresponding storage locations of replicated versions of a data item that are different from one another. Upon detecting a difference between items and the corresponding storage locations, the system may identify a current version of the data item and update any versions of the data item that are not current.

As also described below, embodiments of the present disclosure perform the various functions described above to maintain consistency between replicated data items as a background process that does not interrupt the operations of a storage system.

In one or more embodiments, storage servers described herein (e.g., such as the servers illustrated in FIGS. 1A and 1B) may be described generally as a data repository. The servers may be any type of storage unit and/or device (e.g., a file system, database, collection of tables, or any other storage mechanism) for storing data. Further, a storage server and/or storage cluster may include multiple different storage units and/or devices. The multiple different storage units and/or devices may or may not be of the same type or located at the same physical site. Any of the storage servers and/or storage clusters may be communicatively coupled to one another and/or to client systems (e.g., user devices) via a direct connection or via a network. Additional embodiments and/or examples relating to computer networks are described below in Section 5, titled "Computer Networks and Cloud Networks."

In one or more embodiments, a storage system, such as storage system 100 and storage system 118 may be configured as a multi-tenant system. Example tenants include corporations, organizations, enterprises or other entities that access a shared computing resource, such as a storage system 100 or 118.

In one or more embodiments, the embodiments described herein may be executed as hardware and/or software configured to perform operations described herein for efficiently updating data items in a storage system and maintaining consistency between data items. Examples of operations are described below with reference to FIGS. 2 and 3.

In embodiments described herein (whether storage nodes, storage clusters, or devices executing example methods described below) may be implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

3. Identifying and Resolving Differences Between Stored Data Items

Figure 2:
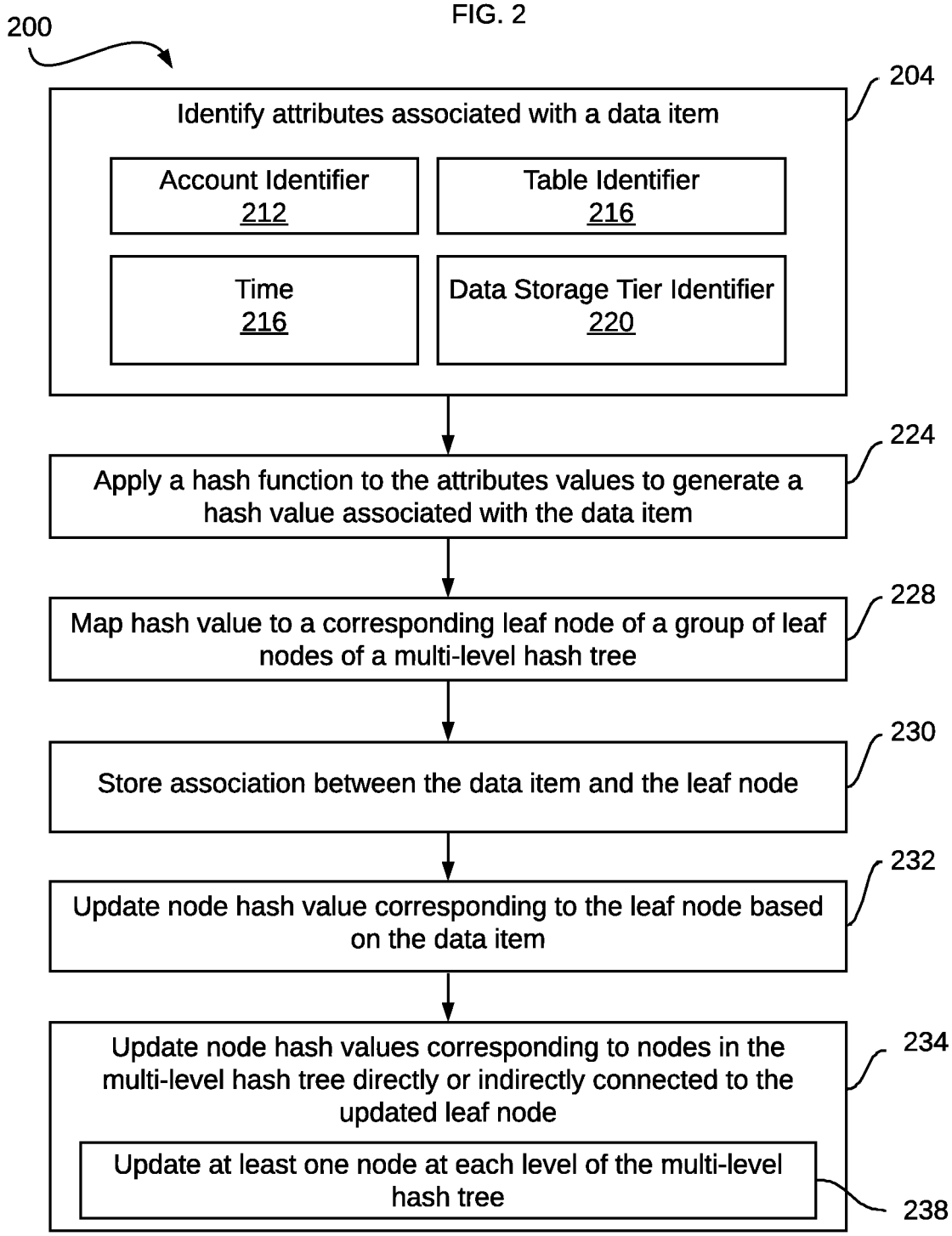
FIG. 2 illustrates an example set of operations for an example method for generating multi-level hash trees based on attributes associated with data items stored in association with a corresponding multi-level hash tree.
Figure 3:
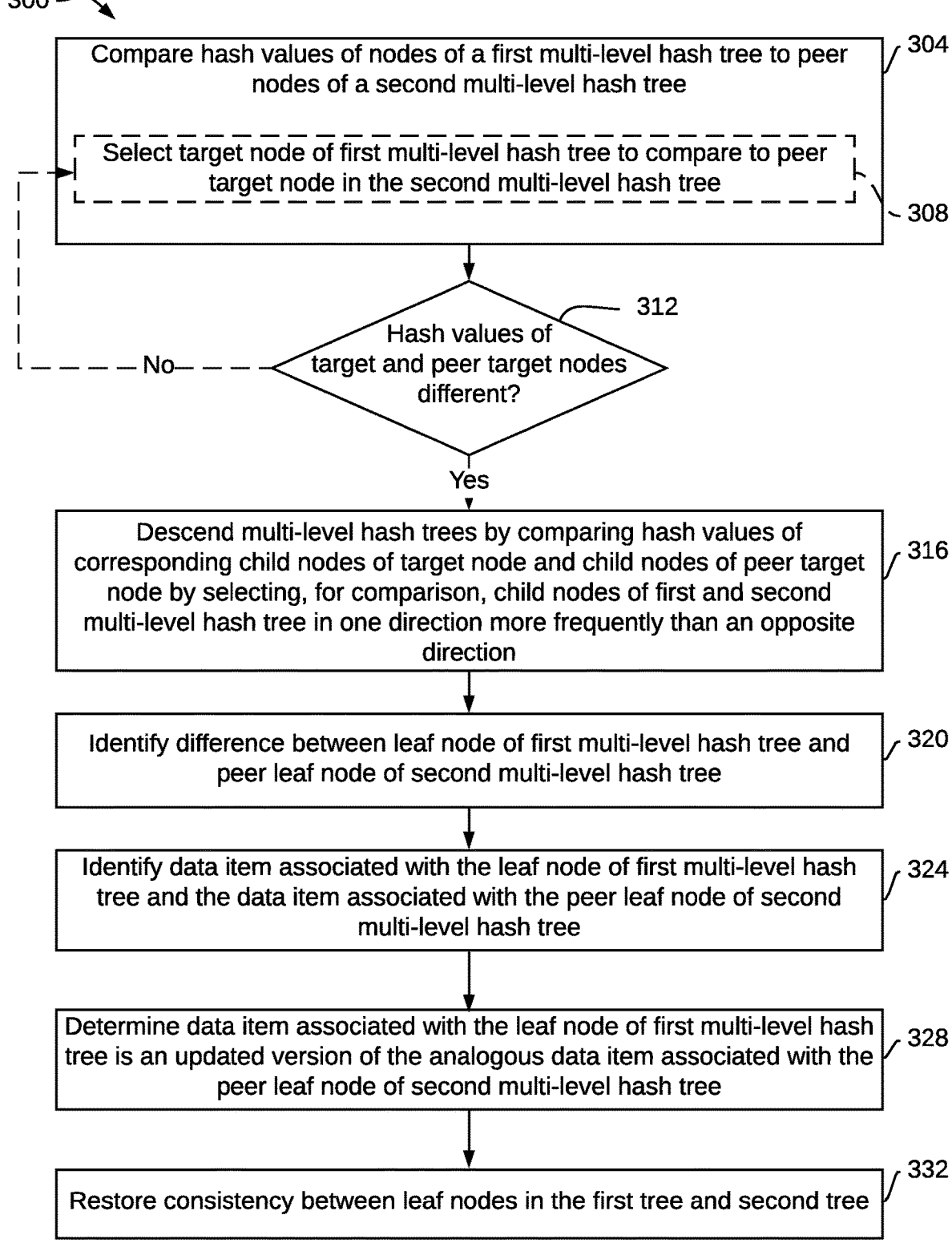
FIG. 3 illustrates an example set of operations for comparing hash values associated with corresponding multi-level hash trees, identifying a difference between replicated copies of a data item, and updating one of the replicated copies in accordance with one or more embodiments.

FIGS. 2 and 3 illustrate example sets of operations for generating data structures to efficiently (1) identify that replicated copies of a data item are inconsistent with one another, (2) identify a current version of the data item, and (3) replicate the current version of the data item to replace out of date versions. In some embodiments, storage servers may execute the techniques described herein as a background process without removing storage nodes from operation to validate the currency of the data items.

Example operations for executing various aspects of embodiments are described below in Sections 3.1 and 3.2. One or more operations illustrated in FIG. 2 or 3 may be modified, rearranged, or omitted all together. Accordingly, the particular sequence of operations illustrated in FIG. 2 or 3 should not be construed as limiting the scope of one or more embodiments.

3.1 Multi-Level Hash Tree Generation

At a high level, embodiments described herein generate hash values based on one or more data item attributes for data items that are stored within a data storage system. Some hash value labels are applied to "leaf nodes" that form a lowest or "bottom" level of a hierarchical multi-level hash tree. Nodes associated with successively higher levels within a multi-level hash tree include a greater number of leaf nodes and mid-level nodes therebetween. Each particular node within the multi-level hash tree is labeled with a hash value corresponding to the data item(s) stored in association with the leaf nodes that are hierarchically directly or indirectly connected associated with the particular node.

The system may efficiently identify differences between multi-level hash trees that are intended to mirror one another (e.g., by being associated with different replicated copies of the same data items) by comparing hash values at each successive peer level of the corresponding multi-level hash trees. This in turn enables computationally efficient identification of inconsistencies between leaf nodes that should be associated with a same hash value.

Because the system may maintain multi-level hash trees using the storage servers themselves, the system may efficiently update hash values at each level of a tree as data items are revised, changed, and/or deleted. This further enables the embodiments described herein to function as continuously operating background processes that maintain consistency and currency between different storage nodes.

FIG. 2 illustrates example operations for an example method 200 used by the system to generate multi-level hash trees based on attributes associated with data items.

The example method 200 may begin by identifying attributes associated with a stored data item (among a plurality of stored data items) that are used to generate a hash value for a leaf node in a multi-level hash tree associated with the data item (operation 204). The operation 204 in FIG. 2 provides four examples of attributes that, in combination with one another, may be used to uniquely identify a data item. The illustrated attributes in this example include an account identifier 212, a time 216, a table identifier 216, and/or a data storage tier identifier 220.

In some examples, the system may use an account identifier 212 that is associated with a tenant of a multi-tenant storage system, an origin of the data item (e.g., a user identifier, an email address), or an owner of the storage account. In some examples, the time 216 may correspond to a write time (e.g., month, day, year, time of day, and/or day/hour/minute/second/millisecond) of the data item, a read time of the data item, a storage time, or other similar temporal measurement of a defined creation, edit, storage, and/or data transaction event executed on or otherwise associated with the data item. The table identifier 216 may be associated with a table data structure in which a reference to the data item is stored. A storage system may maintain one or more tables per server and/or per storage cluster as an aid to the organized storage of data items. The system may use the table identifier 216 corresponding to each of these tables to retrieve data items and as an attribute. The data storage tier identifier 220 may be metadata associated with a stored data item that identifies the storage servers on which a data item is stored. In some examples, the data storage tier identifier 220 may also indicate whether a data item is stored in an "active tier" of data items that are associated with an active data session (e.g., changes to the data item are being received or have been received within a time threshold from a most recent change) or an "inactive tier" (alternatively described as a "historic tier") in which data items that are not associated with an active data session are stored. The system may use other attributes (alone or in combination with the preceding attributes) to uniquely identify leaf nodes.

Once the system identifies the attributes for a data item, the system generates a hash value for the data item based on the corresponding attributes (operation 224). In some examples, the system generates this address by executing a checksum and/or hash algorithm on the identified attributes associated with the data item. In some examples, the system executes a cyclic redundancy check (CRC32) checksum algorithm on the attributes of the data item.

In examples in which the data item is replicated to multiple storage servers (which may be distributed between different storage clusters) in a collocation redundancy technique, a first server may receive the data item, identify the attributes, generate the hash value, and then transmit the data item to a second server, which computes the attribute-based hash value associated with the data item. The second server may store the data item and transmit the data item to a third storage server, which computes the attribute-based hash value associated with the data item. In other examples, the first sever transmits the generated hash value along with the data item to the second server, which in turn passes both to the third server. The system may execute this server-based transmission replication process any number of times corresponding to the number of replications specified by the storage system.

In addition to the attributes, the system also maintains a version counter for each data item. The version counter may use any of a number of techniques to sequentially count a number of times each data item, and more specifically each copy of each data item, is saved, updated, or edited. When the system compares replicated copies of a particular data item and determines that differences exist between the replicated copies, the system will select the copy associated with a highest value of the version counter as the most current version. In some embodiments, the version counter may be a simple sequential counter that increments each time a copy of a data item is saved, updated or otherwise edited. In other embodiments, the version counter may be a vector clock. In still other embodiments, the system may use a size of a file to identify a most recent version (alone or in combination with any of the other types of version counters described above) by presuming that a larger data item (e.g., occupying more storage space) is the most recent version.

The system (or more specifically, each server in a storage system) may map the hash value generated for the first data item to a first level node in a group of leaf nodes of a multi-level hash tree (operation 228). In some embodiments, a structure of a multi-level hash tree may be characterized by a highest "root" node (also referred to as a "highest" level"), a lowest level of nodes (also referred to as "level 1" nodes or "leaf nodes") and one or more multiple levels of intervening mid-level nodes. Regardless, as indicated above, the system maps the first hash value to a corresponding first leaf node of the first multi-level hash tree.

The system stores an association between the first data item and the first leaf node (operation 230). This association between the data item and the leaf node enables a variety of actions to be executed. As described below in more detail, the association between a leaf node and a data item enables hash values associated with nodes to be updated in response to a change to the data item. By comparing hash values that are associated with various nodes of the multi-level hash tree (also referred to as node "labels"), the system may efficiently analyze consistency between replicated data items. The system may store an associated between the first data item and the first leaf node as a data object, a link, pointer, or other similar references that logically connects the first data item and the first leaf node.

The system then may update a node hash value that "labels" the leaf node associated with the data item based on the first data item (operation 232). For example, in the situation in which the first data item is the only data item associated with the corresponding leaf node, storage of the first data item may cause the leaf node to be labeled (or, more generally, associated) with a node hash value that corresponds to the first data item hash value. In the situation in which the first data item is one of several data items associated with the corresponding leaf node, the addition of the first data item to the several data items already associated with the corresponding leaf node will cause the node hash value to be updated.

In one example, the system may generate the node hash value by first generating a checksum value for the one or more data items associated with a corresponding leaf node. The checksum value may be based on the various attributes, as described above (e.g., executing a CRC 32 checksum algorithm on one or more of the attributes for a data item). In some examples, the system may combine a hash value for a data item with a corresponding version counter value. The system may combine the checksum and version counter values for different data items with one another, as described above.

In examples in which multiple data items are associated with a node (for example, with a mid-level node that is a "parent" to multiple "child" leaf nodes), the system may generate the hash value by concatenating the hash values of the different data items together. In another example, the system may combine attributes of the various data items and then hash the combined value(s). The system may use any convenient hash algorithm to generate the hash value, including but not limited to MD5.

Regardless of the technique by which the data item attributes are combined and hashed, a collection, a concatenation, or other type of combination of the data item hash values are themselves hashed to generate the node hash value (operation 232).

Because the hash value is based on unique data item attributes and a version counter value, the resulting hash value may be used to determine differences between different versions of data items stored in associated with corresponding leaf nodes of different multi-level hash trees. If the system detects differences between versions of the same data items stored in association with different multi-level hash trees, then the system may identify a current (e.g., more recent) version and propagate that version so as to replace older versions.

The system may extend the process described above for labeling leaf nodes to nodes in the multi-level hash tree above the leaf nodes and up to and including the root node. In other words, upon associating a data item with a leaf node and generating and/or updating a leaf node hash value, the system may update node hash values corresponding to higher level nodes in the multi-level hash tree that are connected to the updated leaf node (operation 234). For example, the system may generate an updated node hash value for a "second level node" that includes two "child" leaf nodes by performing operation 232 for the data items stored in the two constituent leaf nodes associated with (often shown and described as "under") the second level node. Similarly, the system may generate an updated node hash value for a "third level node" that includes, for example, multiple second level nodes, by performing operation 232 for the data items stored in the leaf nodes associated with the constituent second level nodes "under" the third level node.

By repeating the operation 232 at each level of the multi-level hash tree, the system may associate a hash value for each node in the multi-level hash tree that is indicative of the data items stored in association with the nodes (operation 238).

As described below in the context of FIG. 3, the method 200 enables the system to maintain consistency between data items stored in a data storage system in a computationally efficient and fast manner. In some examples, hash values associated with a root node (and lower level nodes) in a multi-level hash tree can be configured as a 4 byte integer. In this situation, the system may determine consistency between entire storage servers simply by the comparison of these 4 byte integers. If a difference is detected as a root node level between trees, then the system may identify a location of any consistencies by comparing similarly concise hash values at successively lower peer nodes in the multi-level hash trees.

Servers within a storage system may maintain their corresponding multi-level hash trees representing their stored data items and may update the multi-level hash trees as data are received. Because this updating process is computationally efficient (using checksum and hash algorithms), the servers may maintain currency of their corresponding multi-level hash trees themselves, without resorting to an external management or administrative system or added operational downtime.

3.2 Identifying and Resolving Differences Between Redundant Data Items

Periodically, servers maintaining analogous multi-level hash trees (i.e., corresponding to a set of replicated data items that are intended to be consistent) may communicate with one another to compare peer nodes (i.e., nodes at corresponding levels and/or locations within a hash tree) of their corresponding multi-level hash trees. This comparison is used by the system to determine whether the replicated data items are consistent with one another. FIG. 3 illustrates an example set of operations (identified collectively as method 300) for identifying differences between replicated copies of a data item stored in association with different multi-level hash trees.

The method 300 may begin by the system comparing node hash values associated with a first multi-level hash tree to peer node hash values associated with a second multi-level hash tree (operation 304). In some examples, comparing hash values of corresponding nodes between a first multi-level hash tree and a second multi-level hash tree may begin by the system selecting a target node in the first multi-level hash tree as a starting point for the comparison (operation 308). This target node may be any node within the first multi-level hash tree and at any desired level within the hash tree.

However, selecting a target node particular levels within the hash tree may be more computationally efficient than others. For example, selecting a mid-level node (between the root node and the leaf nodes) may be more efficient than, for example, selecting a leaf node because a hash value of a mid-level node may be based on many constituent leaf nodes. If no difference is detected between compared mid-level nodes, no additional analysis of the child leaf nodes below the compared mid-level nodes in the first and second multi-level hash trees is needed. In some examples, selecting a target mid-level node within one to two levels of a level half-way between root and leaf nodes (e.g., level 6, 7, or 8 of a 14 level hash tree) may provide the most computational efficiencies.

In other examples, the system may select the target node randomly. Because, in some embodiments, storage servers execute the embodiments described herein continuously as background processes, random selection of target nodes will eventually lead to analysis of an entire storage system. Furthermore, even though a system may develop many inconsistencies between corresponding replicated copies of a data item, the continuously executed background processes will identify and resolve these inconsistencies progressively over time even when target nodes are selected randomly.

In some embodiments, to maintain background process computing consumption at a level that does not impair the operation of the storage servers for writing and reading data from the storage partitions, embodiments herein may select and/or analyze target nodes at a controlled rate. For example, the system may select a target node and execute the corresponding analysis at a rate defined by the available computing resources of a particular storage server and/or storage cluster. Embodiments may include selecting and/or analyzing a target node every millisecond, every 10 milliseconds, every 100 milliseconds, or the like.

Once selected, a hash value of the target node in the first multi-level hash tree is compared to the analogous, peer node of the second multi-level hash tree to determine whether the hash values associated with the target and peer target nodes are the same or different (operation 312). If the hash values associated with the target and peer target nodes are the same, then no differences are present in the hash values associated with the child nodes of the target and peer target nodes. In this case, the system may return to operation 308 and select a different target node.

If the hash values associated with the target and peer target nodes are different, then the system may execute a descending comparison of hash values for child nodes associated with the target node and the peer target node (operation 316). This systematic comparison of analogous hash values in the first and second multi-level hash trees at corresponding levels "below" the target and peer target nodes may detect one or more leaf nodes (and therefore data items) that are different from one another.

Figure 4:
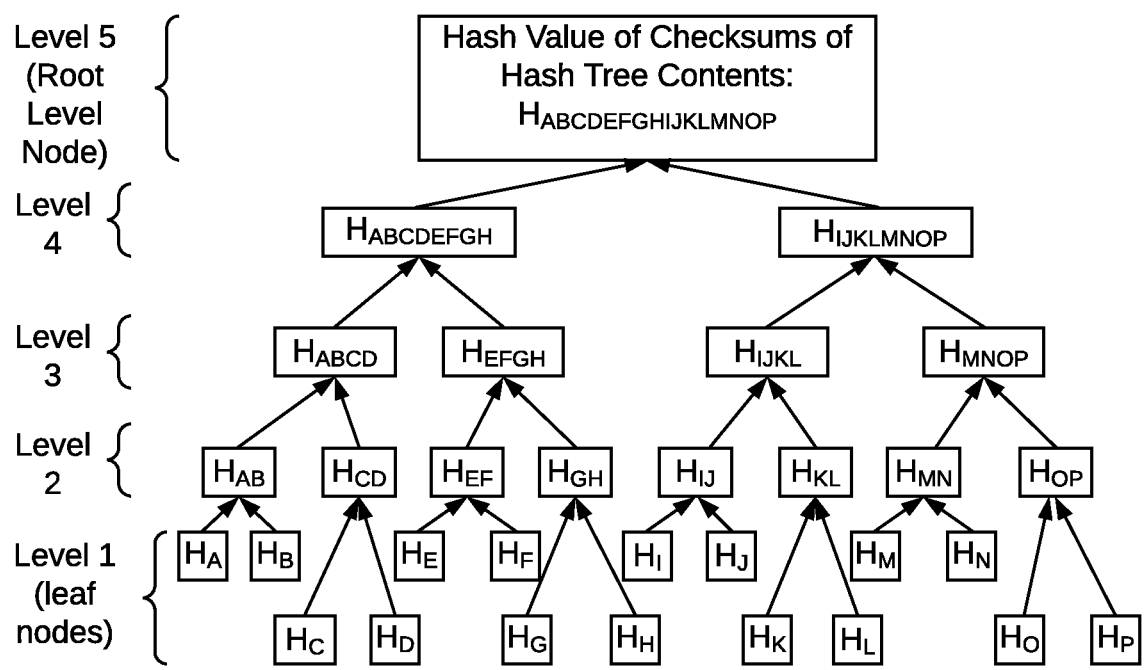
FIG. 4 illustrates an example of a multi-level hash tree corresponding to a storage system in accordance with one or more embodiments.

In some examples, the descent from the target and peer target nodes is biased to favor selecting nodes in one direction (operation 316). For example, when graphically presenting a multi-level hash tree in two-dimensions (e.g., as depicted in FIG. 4), the system may select child nodes on a left side of a node at a higher level of the multi-level hash tree more frequently than nodes on a right side. This selection bias may cause child nodes on one side to be selected anywhere from twice as often to five times as often as child nodes on an opposite side. This preference of selecting, for example, nodes closer to a left side of a multi-level hash tree more often than those closer to the right side prevents various types of inefficiencies. For example, in some cases, an equal (50/50) selection probability of child nodes (or an exclusive probability of always selecting nodes in one direction) may cause multiple servers to identify a same inconsistency and simultaneously attempt to resolve the same inconsistency. Colloquially known in distributed computing as the "thundering herd problem," this situation may decrease the speed of resolving the target inconsistency and reduce the frequency that other inconsistent nodes are identified. Biasing selection of one direction greater than 50% and less than 100% may avoid the thundering herd problem and its inefficiencies.

In another example of an inefficiency that is avoided by some embodiments described herein may be caused by an equal probability of selecting a right-hand node and a left-hand node (i.e., 50/50 selection probability). This situation may cause a system to overestimate dissimilarity between peer servers, and in particular a newly added server that is missing data.

In some examples, the system may use a graph walking algorithm to successively select peer nodes in multi-level hash trees for comparison. In some examples, a graph walking algorithm (or generically, a selection policy algorithm) may bias a probability of selecting a node in one direction (i.e., to one side of the tree) in preference to the other.

Ultimately, the descending comparison of successively lower peer nodes in the first and second multi-level hash trees leads to identification of a leaf node in the first multi-level hash tree that is different from an analogous peer leaf node in the second multi-level hash tree (operation 320). As described above, the system may efficiently execute the comparison between hash values of leaf nodes (and any of the preceding mid-level nodes) by comparing the 4-bit (or smaller) hash values between leaf nodes.

The system may identify a data item stored in association with the leaf node of the first multi-level hash tree and also stored in association with the peer leaf node of the second multi-level hash tree (as a replicated copy) (operation 324). The system may identify these data items by, for example, referencing a storage address that is associated with the leaf node. Using an associated storage address enables the system to retrieve, from a memory location, the data items. In some examples, the leaf nodes may be associated with one or more data item identifiers. The system may access a storage location corresponding to the data item identifier (e.g., by referencing a relational database, a lookup table, an active point).

Once inconsistent versions of a data item are identified at their corresponding storage locations, the system may determine which of the stored data items is the more current version (operation 328). For example, the system may compare version count values of the compared data items. In the example presented above, the system may compare a version counter value for the data item stored in association with the first multi-level hash tree to a version counter value for the data item stored in association with the first multi-level hash tree. A greater value of version counter indicates a current version of the data item. As described above, examples of the version counter may include a size of a document, a revision date, a storage date, a vector clock, or a simple counter indicating a number of revision (or storage) events.

In some examples, a data item may be deleted from one partition. In this case, the "current" version of the data item is the absence of the data item. In this particular scenario, the system may maintain the hash value of the deleted data item (e.g., the checksum of object attributes) and the corresponding version counter value in a multi-level hash tree even though the data item itself has been removed from the storage system. Because the version counter value for the deleted copy will have the highest value, the deletion will be replicated throughout the system using the techniques described herein. In some examples a time of deletion and a label (colloquially referred to as a "tombstone") indicating deletion may also be stored with the version counter to definitively indicate that the data item has been removed.

The server storing the current version may then restore consistency between the compared leaf nodes associated with the first and second multi-level hash trees (operation 332). In one example, the server may restore consistency by storing the more recent version of the data item transmitting the current data item to the server storing an out of date version. The server storing the out of date version then updates and/or replaces its version and updates the version count value, thereby restoring consistency between versions.

Once updated, the server receiving the updated version of the data item may return to the method 200, thereby updating a corresponding leaf node hash value and "higher" level hash values of the second multi-level hash tree.

4. Example Embodiments

A detailed example is described below for purposes of clarity. Components and/or operations described below should be understood as one specific example which may not be applicable to certain embodiments. Accordingly, components and/or operations described below should not be construed as limiting the scope of any of the claims.

FIG. 4 illustrates an example of a multi-level hash tree 400 that may be used to analyze the consistency of replicated data items stored in a storage system in accordance with one or more embodiments. The multi-level hash tree 400 illustrated has 5 levels, although the number of levels may be configured according to the storage system. In some examples, not shown, a multi-level hash tree may have as many as 15, 16, 17, 18, 19, or 20 levels.

The Root level node (Level 5) is labeled with a hash value ($H_{ABCDEFGHIJKLMNOP}$) that corresponds to the hash values of data items stored in association with the leaf nodes "under" (i.e., directly or indirectly connected to) the root level node. As can be seen, the Level 1 leaf nodes are labeled with hash values generated according to the technique described above, which are represented in FIG. 4 has $H_A$, $H_B$, $H_C$ . . . $H_P$.

The Level 2 nodes are associated with two leaf nodes in the illustrated embodiment. Each of the Level 2 nodes is labeled with a hash value that corresponds to its associated leaf nodes (e.g., $H_{AB}$, $H_{CD}$, $H_{EF}$, $H_{GH}$, . . . $H_{OP}$). The Level 3 nodes in this embodiment are associated with two Level 2 nodes and labeled with hash values that correspond (directly) to the hash values of the constituent Level 2 nodes and (indirectly) to the hash values of the associated leaf nodes. This logical configuration of nodes and labeling is repeated for the Level 4 nodes, each of which includes two Level 3 nodes and is labeled according the pattern described above.

Figure 5A:
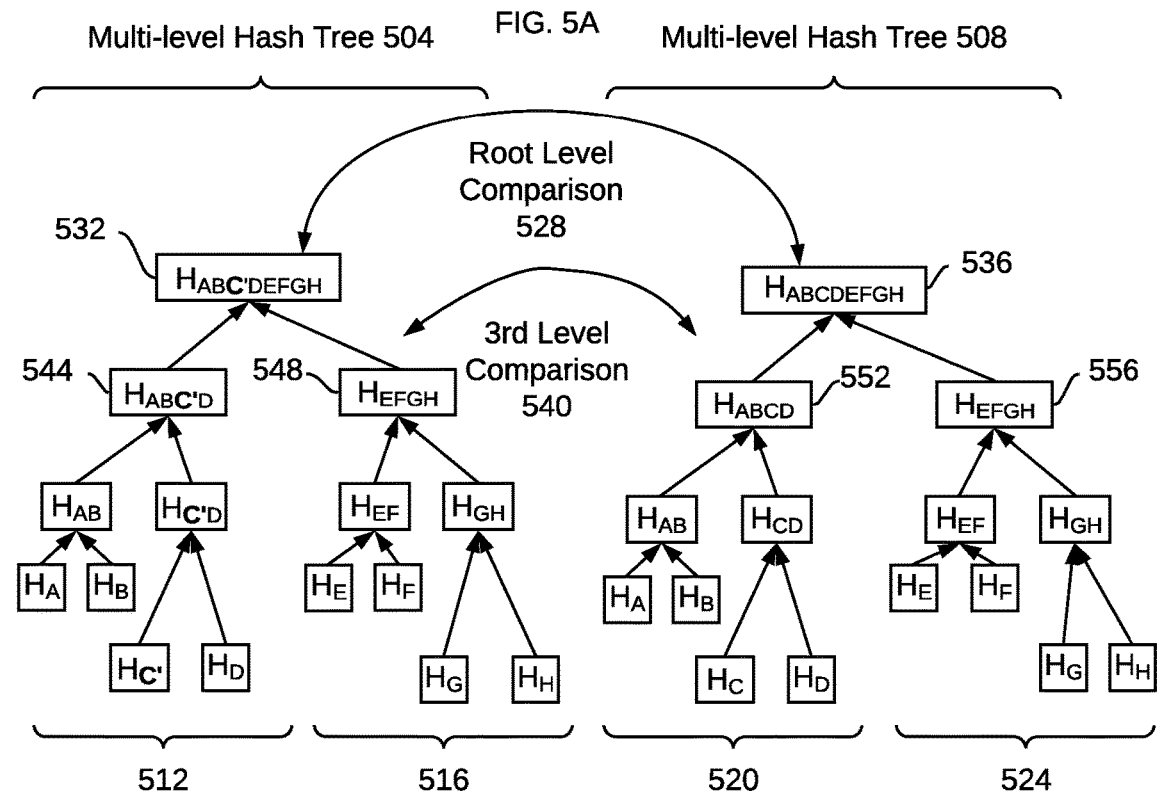
FIGS. 5A, 5B, and 5C schematically illustrate an example of using multi-level hash trees to identify differences between peer storage systems in accordance with one or more embodiments.
Figure 5B:
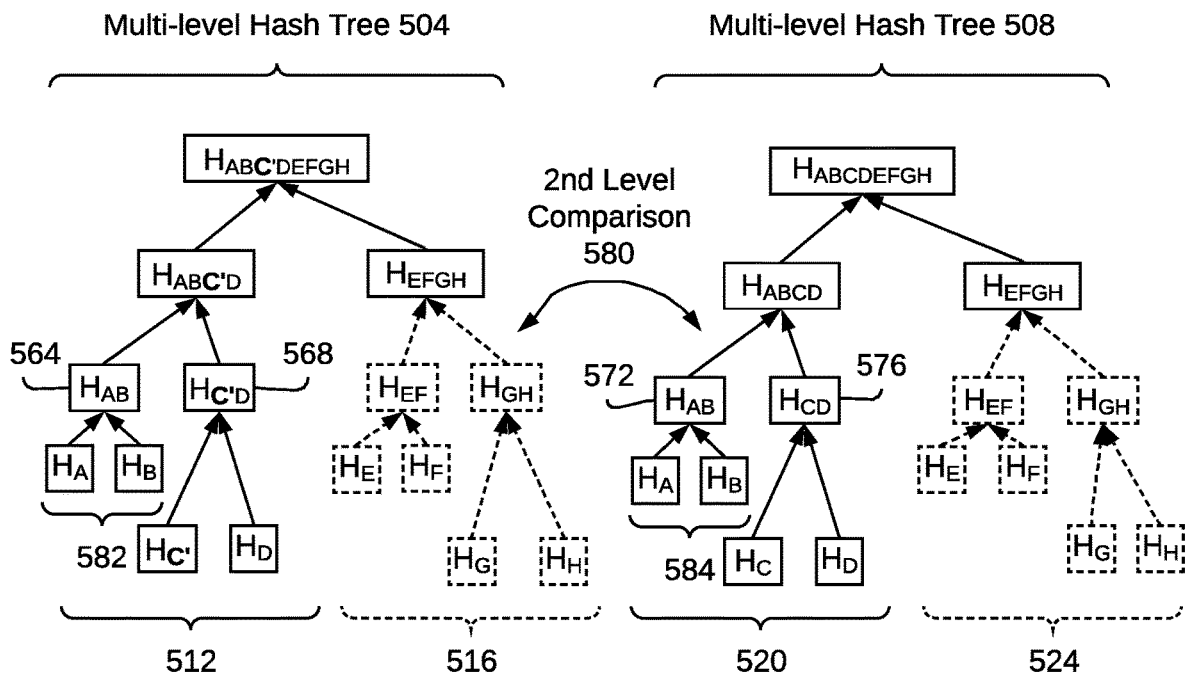
Figure 5C:
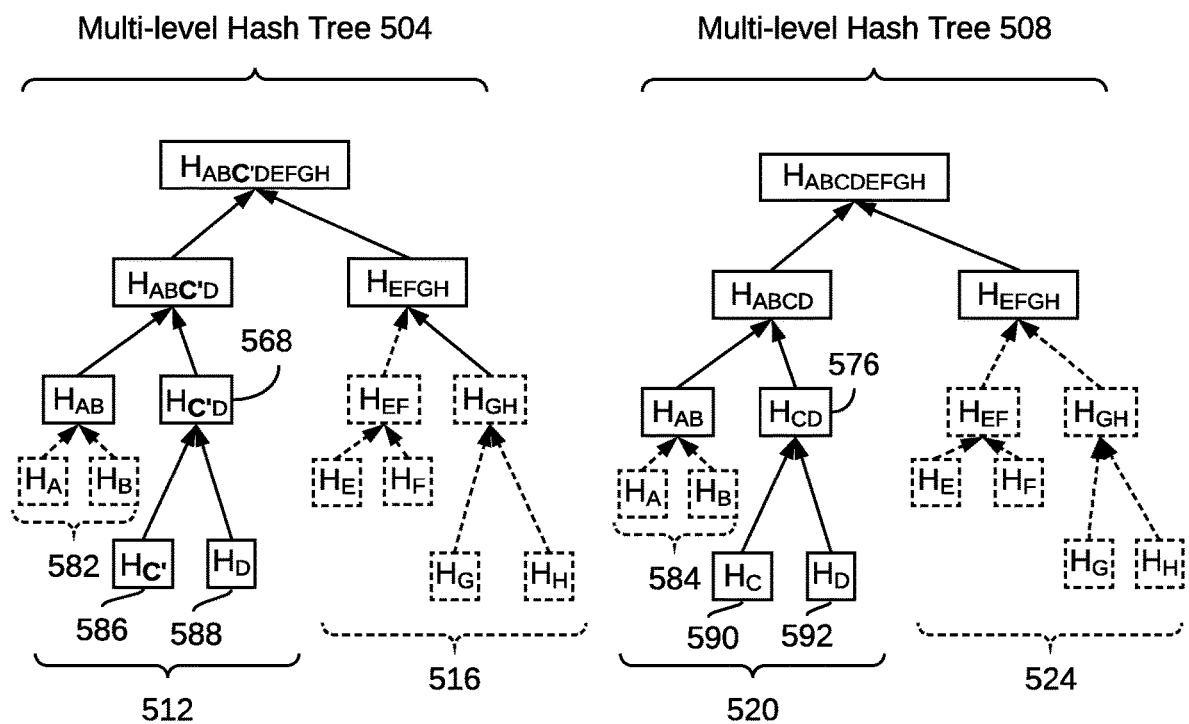

FIGS. 5A, 5B, and 5C illustrate a process of comparison of peer nodes that may identify differences between replicated copies stored in association with the two different, corresponding multi-level hash trees. The scenario schematically illustrated in FIG. 5A includes a multi-level hash tree 504 that includes a Root node (Level 4) 532, two Level 3 nodes 544, 548, four Level 2 nodes, and eight Level 1 (leaf) nodes. The leaf nodes are grouped into a first group 512 and a second group 516.

FIG. 5A also includes a multi-level hash tree 508 that is represented by a Root node (Level 4) 536, two Level 3 nodes 552, 556, four Level 2 nodes, and eight Level 1 (leaf) nodes. The leaf nodes are grouped into a third group 520 and a fourth group 524.

A Root level comparison 528 between the hash labels of Root nodes 532 and 536 indicates a difference between data associated with the two multi-level hash trees. This is indicated in FIG. 5A as a label for Root node 532 $H_{ABC'DEFGH}$ and a label for Root node 536 $H_{ABCDEFGH}$. The "C'" in the Root node 532 indicates a revised version of a file C (compared to "C" in the Root node 536).

A third level comparison 540 at the level immediately below the root level compares corresponding nodes 544 to 552 and 548 to 556. The hash values associated with corresponding nodes 548 and 556 are the same, whereas the hash values associated with 544 and 552 are different. In light of this comparison, the branches of the multi-level hash trees associated with nodes 548 and 556 need no further analysis because the hash values indicate that the data items stored in corresponding data partitions are consistent with one another.

Turning to FIG. 5B, the branches of the multi-level hash trees associated with nodes 548 and 556, including leaf node groups 516 and 524, appear in dashed lines indicating that no further analysis is executed on these portions of the multi-level hash trees. The second level comparison 580 is executed by comparing node 564 to node 572 and node 568 to node 576. The nodes 564 and 572 have the same labels ($H_{AB}$) and therefore their corresponding leaf nodes (grouped at 582 and 584 respectively) are not analyzed further.

Turning to FIG. 5C, leaf nodes 586 and 588 under node 568 are compared, respectively, to leaf nodes 590 and 592, thereby identifying not only a difference in leaf nodes of 586 and 590 (with hash value labels $H_{C'}$ and $H_C$ respectively), but also the data items stored in associated with the leaf nodes 586, 590.

Figure 6:
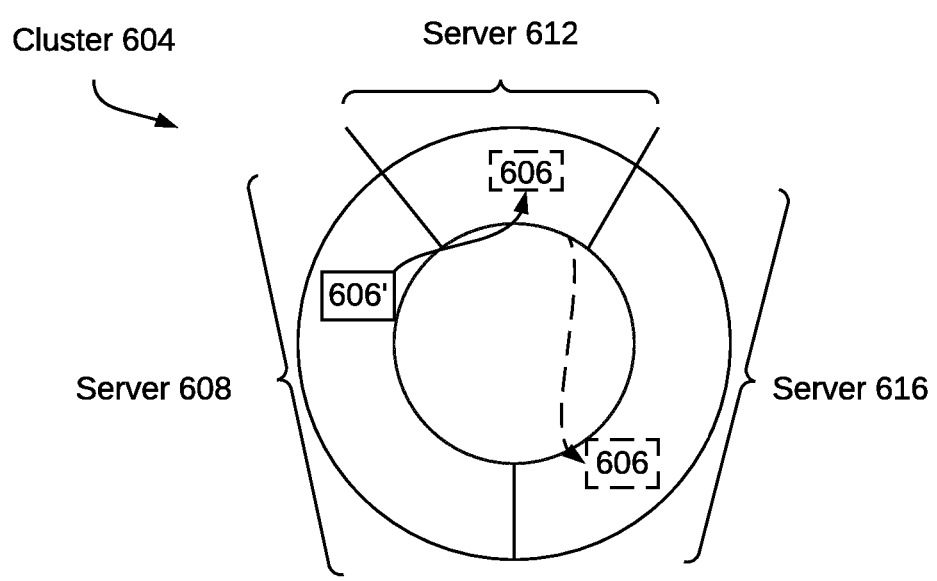
FIG. 6 schematically illustrates one example embodiment in which an updated copy of a stored data item is transferred from a first storage server to peer storage servers to maintain data currency across replicated copies of the data item using a background data reconciliation process in accordance with one or more embodiments.

FIG. 6 schematically illustrates peer storage servers in a storage cluster that execute one or more of the embodiments described above as background processes to maintain consistency of a data item across the servers. The storage cluster is schematically illustrated in FIG. 6 as a ring to emphasis the intercommunication and cooperation of the individual servers within the cluster.

The storage cluster 604 includes individual storage servers 608, 612, and 616. The server 608 receives an updated version of data item 606'. The servers 612 and 616 store a prior version of the data item 606. The server 608, executing some or all of the processes described above, identifies the data item 606 on the server 612 as out of date. The server 608 then transmits the data item 606 to the server 612, thereby replacing the out of date data item 606 with the most recent version of the data item 606'. In a subsequent execution of some or all of the processes described herein, the server 612 may identify the out of date version of the data item 606 stored on the server 616 and transfer the current version 606' to the server 616. In this way, peer storage servers communicate with one another to identify a current version of a data item and use it to replace any versions of the data item that are out of date.

In some examples, the cluster 604 stores the data item 606' at the various storage locations according to a policy that defines a sequence of write operations. For example, instead of writing a data item to multiple storage partitions and/or servers simultaneously, the cluster 604 instead may write the data item to a first server, in this example the server 608. In one embodiment, the first server 608 to store the data item may be the server that is in communication with a client (e.g., a user device) transmitting the data. In other embodiments, a first server to store the data item may be selected using other criteria (e.g., randomly, based on a lowest storage capacity utilization, based on a lowest processor utilization, or other performance attribute). Upon the first server 608 writing the data item 606', the first server 608 may transmit the data item to a second server 612 selected according to the storage policy. The second server 612 may in turn select a third server 616 and transmit the data to the third server 616 for storage. This example of a serial storage of a data item may be used to spread the use of computing resources in a storage system over time, thereby reducing the likelihood of simultaneous write operations causing system delays.

5. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants.

In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

7. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

8. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 7:
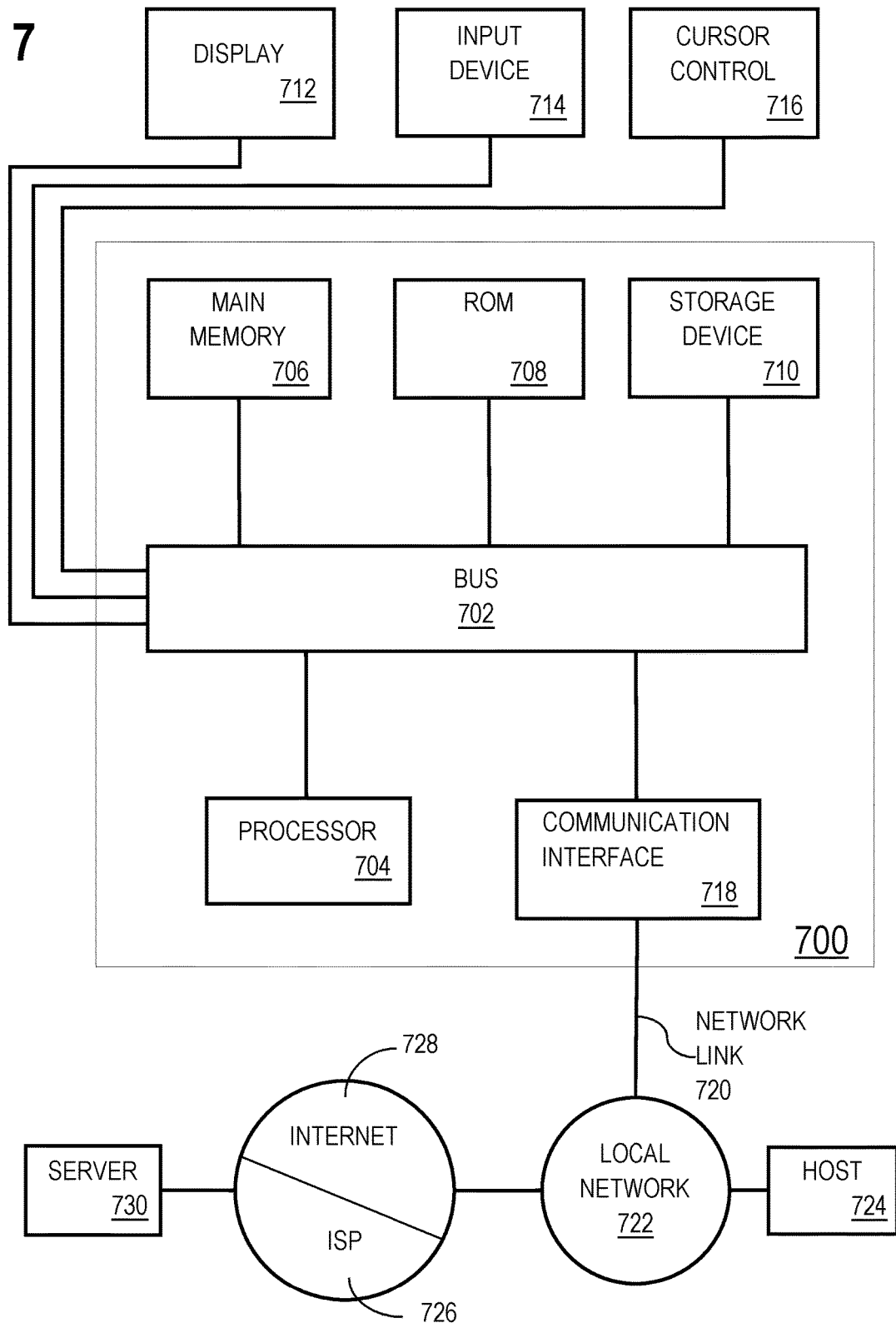
FIG. 7 shows a block diagram that illustrates a computer system in accordance with one or more embodiments.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 710. Volatile media includes dynamic memory, such as main memory 706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory computer-readable media storing instructions, which when executed by one or more hardware processors, cause performance of operations comprising:
    identifying at least one attribute of a first data item of a plurality of data items;
    applying a hash function to the at least one attribute to compute a first data item hash value;
    mapping the first data item hash value to a first leaf node of a first plurality of leaf nodes of a first multi-level hash tree, the first leaf node being associated with a first node hash value;
    storing a new association between the first data item and the first leaf node;
    updating the first node hash value corresponding to the first leaf node based on the new association between first data item and the first leaf node; and
    updating node hash values corresponding to a subset of nodes of the first multi-level hash tree that are direct or indirect parents of the first leaf node;
    comparing a first set of node hash values corresponding to the nodes of the first multi-level hash tree to a second set of node hash values corresponding to nodes of a second multi-level hash tree until at least a difference is identified between (a) the first node hash value corresponding to the first leaf node of the first multi-level hash tree and (b) a second node hash value corresponding to a second leaf node of the second multi-level hash tree;
    wherein the second leaf node of the second multi-level hash tree is a peer of the first leaf node of the first multi-level hash tree;
    responsive to identifying the difference between the first node hash value and the second node hash value:
        determining that the first data item, associated with the first leaf node, is an updated version of a second data item associated with the second leaf node by comparing one or more data items associated with the first leaf node to one or more data items associated with the second leaf node; and
        updating the second data item to match the first data item.

2. The one or more media of claim 1, wherein the comparing operation comprises:
    selecting, for comparison, a target node of the first multi-level hash tree and a peer target node of the second multi-level hash tree; and
    responsive to determining that a first node hash value of the target node of the first multi-level hash tree and a second node hash value of the peer target node of the second multi-level hash tree are different, executing a descending comparison of hash values of child nodes of the target node to hash values of peer child nodes of the second multi-level hash tree;
    wherein the child nodes of the first multi-level hash tree are selected more frequently in a first descending direction for comparison to the peer child nodes of the second multi-level hash tree than in a second descending direction.

3. The one or more media of claim 2, wherein child nodes of the first multi-level hash tree in the first descending direction are selected from two times to four times more often than child nodes in the second descending direction.

4. The one or more media of claim 1, wherein the operations further comprise determining a storage location for storing the first data item based on a second hash value corresponding to the at least one attribute.

5. The one or more media of claim 1, wherein data items corresponding to first leaf node are stored in a particular memory region.

6. The one or more media of claim 5, wherein the particular memory region is identified in the first leaf node using a data item identifier.

7. The one or more media of claim 1, wherein the at least one attribute comprises an account identifier.

8. The one or more media of claim 1, wherein the at least one attribute comprises a time associated with a data transaction event.

9. The one or more media of claim 1, wherein the at least one attribute comprises a table identifier.

10. The one or more media of claim 1, wherein the at least one attribute comprises a data storage tier identifier.

11. The one or more media of claim 1, wherein the at least one attribute comprises one or more of the following:
    an account identifier identifying an account associated with the first data item;
    a time associated with a data transaction event executed on the first data item;
    a table identifier identifying a data structure associated with the first data item;
    a data storage tier identifier identifying storage of the first data item in an active tier; and
    a data storage tier identifier identifying storage of the first data item in an inactive tier.

12. The one or more media of claim 1, wherein updating the hash value for at least one node at each level of the multi-level hash tree, comprises:
    updating a first hash value for at least one first node at a first level of the multi-level hash tree connected to the leaf node; and
    updating a second hash value for at least one second node at a second level of the multi-level hash tree connected to the leaf node through the first node.

13. A method comprising:
    identifying at least one attribute of a first data item of a plurality of data items;
    applying a hash function to the at least one attribute to compute a first data item hash value;
    mapping the first data item hash value to a first leaf node of a first plurality of leaf nodes of a first multi-level hash tree, the first leaf node being associated with a first node hash value;
    storing a new association between the first data item and the first leaf node;
    updating the first node hash value corresponding to the first leaf node based on the new association between the first data item and the first leaf node; and
    updating node hash values corresponding to a subset of nodes of the first multi-level hash tree that are direct or indirect parents of the first leaf node in the first multi-level hash tree;
    comparing a first set of node hash values corresponding to the nodes of the first multi-level hash tree to a second set of node hash values corresponding to nodes of a second multi-level hash tree until at least a difference is identified between (a) the first node hash value corresponding to the first leaf node of the first multi-level hash tree and (b) a second node hash value corresponding to a second leaf node of the second multi-level hash tree;
wherein the second leaf node of the second multi-level hash tree is a peer of the first leaf node of the first multi-level hash tree;
responsive to identifying the difference between the first node hash value and the second node hash value:
determining that the first data item, associated with the first leaf node, is an updated version of a second data item associated with the second leaf node by comparing one or more data items associated with the first leaf node to one or more data items associated with the second leaf node; and
updating the second data item to match the first data item.

14. The method of claim 13, wherein the comparing operation comprises:
selecting, for comparison, a target node of the first multi-level hash tree and a peer target node of the second multi-level hash tree; and
responsive to determining that a first node hash value of the target node of the first multi-level hash tree and a second node hash value of the peer target node of the second multi-level hash tree are different, executing a descending comparison of hash values of child nodes of the target node to hash values of peer child nodes of the second multi-level hash tree;
wherein the child nodes of the first multi-level hash tree are selected more frequently in a first descending direction for comparison to the peer child nodes of the second multi-level hash tree than in a second descending direction.

15. The method of claim 14, wherein child nodes of the first multi-level hash tree in the first descending direction are selected from two times to four times more often than child nodes in the second descending direction.

16. The method of claim 13, wherein the operations further comprise determining a storage location for storing the first data item based on a second hash value corresponding to the at least one attribute.

17. The method of claim 13, wherein data items corresponding to first leaf node are stored in a particular memory region.

18. The method of claim 13, wherein the at least one attribute comprises one or more of the following:
an account identifier identifying an account associated with the first data item;
a time associated with a data transaction event executed on the first data item;
a table identifier identifying a data structure associated with the first data item;
a data storage tier identifier identifying storage of the first data item in an active tier; and
a data storage tier identifier identifying storage of the first data item in an inactive tier.

19. The method of claim 13, wherein updating the hash value for at least one node at each level of the multi-level hash tree, comprises:
updating a first hash value for at least one first node at a first level of the multi-level hash tree connected to the leaf node; and
updating a second hash value for at least one second node at a second level of the multi-level hash tree connected to the leaf node through the first node.

20. A system comprising:
at least one device including a hardware processor;
the system being configured to perform operations comprising:
identifying at least one attribute of a first data item of a plurality of data items applying a hash function to the at least one attribute to compute a first hash value;
applying a hash function to the at least one attribute to compute a first data item hash value;
mapping the first data item hash value to a first leaf node of a first plurality of leaf nodes of a first multi-level hash tree, the first leaf node being associated with a first node hash value;
storing a new association between the first data item and the first leaf node;
updating the first node hash value corresponding to the first leaf node based on the new association between first data item and the first leaf node; and
updating node hash values corresponding to a subset of nodes of the first multi-level hash tree that are direct or indirect parents of the first leaf node in the first multi-level hash tree;
comparing a first set of node hash values corresponding to the nodes of the first multi-level hash tree to a second set of node hash values corresponding to nodes of a second multi-level hash tree until at least a difference is identified between (a) the first node hash value corresponding to the first leaf node of the first multi-level hash tree and (b) a second node hash value corresponding to a second leaf node of the second multi-level hash tree;
wherein the second leaf node of the second multi-level hash tree is a peer of the first leaf node of the first multi-level hash tree;
responsive to identifying the difference between the first node hash value and the second node hash value:
determining that the first data item, associated with the first leaf node, is an updated version of a second data item associated with the second leaf node comparing one or more data items associated with the first leaf node to one or more data items associated with the second leaf node; and
updating the second data item to match the first data item.

21. The system of claim 20, wherein the comparing operation comprises:
selecting, for comparison, a target node of the first multi-level hash tree and a peer target node of the second multi-level hash tree; and
responsive to determining that a first node hash value of the target node of the first multi-level hash tree and a second node hash value of the peer target node of the second multi-level hash tree are different, executing a descending comparison of hash values of child nodes of the target node to hash values of peer child nodes of the second multi-level hash tree;
wherein the child nodes of the first multi-level hash tree are selected more frequently in a first descending direction for comparison to the peer child nodes of the second multi-level hash tree than in a second descending direction.

22. The system of claim 20, wherein the at least one attribute comprises one or more of the following:
an account identifier identifying an account associated with the first data item;
a time associated with a data transaction event executed on the first data item;

a table identifier identifying a data structure associated with the first data item;

a data storage tier identifier identifying storage of the first data item in an active tier; and a data storage tier identifier identifying storage of the first data item in an inactive tier.

23. The system of claim 20, wherein updating the hash value for at least one node at each level of the multi-level hash tree, comprises:

updating a first hash value for at least one first node at a first level of the multi-level hash tree connected to the leaf node; and updating a second hash value for at least one second node at a second level of the multi-level hash tree connected to the leaf node through the first node.

* * * * *